United States Patent [19]

Heil

[11] Patent Number: 5,507,002
[45] Date of Patent: Apr. 9, 1996

[54] PERIPHERAL COMPONENT INTERCONNECT SPECIAL CYCLE PROTOCOL USING SOFT MESSAGE IDS

[75] Inventor: Thomas F. Heil, Easley, S.C.

[73] Assignee: AT&T Global Information Solutions Company, Dayton, Ohio

[21] Appl. No.: 996,278

[22] Filed: Dec. 24, 1992

[51] Int. Cl.⁶ ..................................................... H01J 13/00
[52] U.S. Cl. ............................................................ 395/828
[58] Field of Search ................................... 395/200, 325, 395/275, 425, 650, 800, 250, 500, 375, 164, 725, 325, 700, 200, 575, 101, 828; 370/85, 85.5, 85.6, 85.2, 85.7, 85.4, 60.1, 85.9, 54

[56] References Cited

U.S. PATENT DOCUMENTS

| | | | |
|---|---|---|---|
| 4,587,650 | 5/1986 | Bell ......................................... | 370/85.5 |
| 4,633,392 | 12/1986 | Vinent et al. ........................... | 395/325 |
| 4,715,031 | 12/1987 | Crawford et al. ...................... | 370/85.6 |
| 4,816,989 | 3/1989 | Finn et al. .............................. | 395/200 |
| 5,247,519 | 9/1993 | Snowden et al. ....................... | 370/94.1 |

OTHER PUBLICATIONS

Peripheral Component Interconnect (PCI), Revision 1.0 Specification, Jun. 22, 1992.
The UNIX™C Shell Field Guide, Gail & Paul Anderson, Prentice Hall, Englewood Cliffs, N.J., 1986 pp. 26–31, 42–45, 116–127, 226–231.

Primary Examiner—Eric Coleman
Assistant Examiner—Charles R. Kyle
Attorney, Agent, or Firm—George H. Gates

[57] ABSTRACT

A Peripheral Component Interconnect (PCI) bus provides component level interconnection of processors, peripherals and memories. A bus protocol mechanism includes a Special Cycle command for defining "soft", i.e., configurable, transaction types for use between devices communicating on the PCI bus. Using the Special Cycle command, two or more devices attached to the bus can establish a device-specific logical signalling channel that expands upon, but does not violate, the PCI specification. This device-specific signalling channel provides logical sideband signaling between PCI bus devices, when such signaling does not require the precise timing or synchronization of physical signals. This allows the systems designer to define necessary sideband signalling without requiring any additional pins on the PCI bus.

18 Claims, 7 Drawing Sheets

PERIPHERAL COMPONENT INTERCONNECT SPECIAL CYCLE PROTOCOL USING SOFT MESSAGE IDS

BACKGROUND OF THE INVENTION

1. Cross-Reference to Related Applications

This application is related to:

Application Ser. No. 07/997,427, entitled "Peripheral Component Interconnect 'Always On' Protocol," filed on same date herewith by T. Heil, and assigned to the assignee of this application;

Application Ser. No. 07/996,277, entitled "Peripheral Component Interconnect In Concurrent Architectures And As A Main Memory Bus," filed on same date herewith by T. Heil et al. and assigned to the assignee of this application; and Application Ser. No. 07/996,276, now U.S. Pat. No. 5,392,407 entitled "Multi-Port Processor With Peripheral Component Interconnect Port and RAMBUS Port," filed on same date herewith by T. Heil et al. and assigned to the assignee of this application.

All of the above-identified applications are incorporated by reference herein.

2. Field of the Invention

This invention relates in general to interfaces between computers and input/output (I/O) devices, and in particular to a computer I/O bus.

3. Description of Related Art

A communications interface or input/output bus is typically used in computer systems to interconnect separate devices, such as processors, memories, and peripherals. Standardized interfaces such as the ISA, EISA, or Micro Channel™ buses have long been used in computer systems to provide a common I/O board interface across different platforms and different processor generations. However, there are a number of problems associated with these interfaces.

The main problem with these prior interfaces involves cost. Most performance critical peripherals are being moved to motherboards, not only for the performance advantages of processor proximity and minimal interconnect length, but also to leverage the cost and space advantages of higher levels of integration. However, complete integration with the resultant cost and space savings is hampered by lack of a standard component interconnect and the necessity of "glue logic" to connect to the variety of processors and peripheral devices to buses.

Another problem with these prior interfaces involves performance constraints. Standard I/O expansion buses are performance limiting, due to general access latency and the severe bandwidth constraints felt by high performance devices, particularly graphics devices and future communication devices such as fiber LANs.

Further, as highly integrated, performance critical peripheral controllers migrate closer to the processor, there is significant pressure to put them on the "processor treadmill." In other words, these parts are under pressure to track the frequent changes in processor bus frequencies, widths, protocols (e.g., bursting), and signalling standards (e.g., 3 volts). Unnecessarily placing peripheral parts on this treadmill increases system costs and delays the availability of leading edge systems.

Still another problem with prior interfaces involves reliability. As the industry moves toward distributed processing, client systems will become a reliability burden (the weak link) in distributed systems, and therefore will be under pressure to offer levels of reliability and fault containment previously reserved for larger server systems.

SUMMARY OF THE INVENTION

To overcome the limitations in the prior art described above, and to overcome other limitations that will become apparent upon reading and understanding the present specification, the present invention discloses a Peripheral Component Interconnect (PCI) bus that provides component level interconnection of processors, peripherals and memories. A bus protocol mechanism includes a Special Cycle command for defining "soft", i.e., configurable, transaction types for use between devices communicating on the PCI bus. Using the Special Cycle command, two or more devices attached to the bus can establish a device-specific logical signalling channel that expands upon, but does not violate, the PCI specification. This device-specific signalling channel provides logical sideband signaling between PCI bus devices, when such signaling does not require the precise timing or synchronization of physical signals. This allows the systems designer to define necessary sideband signalling without requiring any additional pins on the PCI bus.

The PCI bus is a physical interconnect apparatus intended for use between highly integrated peripheral controller components and processor/memory systems. The PCI bus is intended as a standard interface at the component level in much the same way that ISA, EISA, or Micro Channel™ buses are standard interfaces at the board level. Just as ISA, EISA, and Micro Channel™ buses provide a common I/O board interface across different platforms and different processor generations, the PCI bus is intended to be a common I/O component interface across different platforms and different processor generations. This common I/O component interface results in several benefits which will become readily apparent upon an understanding of the features of the present invention, and the advantages that derive therefrom.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Introduction

The present application describes several inventive features of an interface or bus for computer systems termed the Peripheral Component Interconnect (PCI). A more complete discussion of the PCI bus is available in the document *Peripheral Component Interconnect (PCI), Revision 1.0 Specification*, Jun. 22, 1992, incorporated by reference herein.

A PCI bus is a physical interconnect apparatus intended for use between highly integrated peripheral controller components and processor/memory systems. A PCI bus is intended as a standard interface at the component level in much the same way that ISA, EISA, or Micro Channel™ buses are standard interfaces at the board level. Just as ISA, EISA, and Micro Channel™ buses provide a common I/O board interface across different platforms and different processor generations, the PCI bus is intended to be a common I/O component interface across different platforms and different processor generations.

The specification for the PCI bus is intended to standardize a local bus on which a large variety of I/O components can directly connect without "glue" logic, i.e., direct component interconnection. The goal of direct component interconnection results in several advantages:

Electrical driver and frequency specifications within the reach of ASICs and other VLSI devices.

Cost decreases and reliability enhancements due to a lower parts count, smaller power budget, and higher density packaging.

Performance advantages due to a high speed local bus.

A system I/O core design decoupled from the processor/memory treadmill, thus allowing it to survive multiple generations of processor/memory technology.

A manageable protocol providing a large variety of I/O functions with a common physical interface.

PCI Bus Special Cycle Protocol Using Soft Message IDs

The PCI specification defines a bus protocol mechanism that includes a Special Cycle command for defining "soft", i.e., configurable, transaction types for use between devices communicating on a PCI bus. Using the Special Cycle command, two or more devices attached to the bus can establish a device-specific logical signalling channel that expands upon, but does not violate, the PCI specification. This device-specific signalling channel provides logical sideband signaling between PCI bus devices, when such signaling does not require the precise timing or synchronization of physical signals. This allows the systems designer to define necessary sideband signalling without requiring any additional pins on the PCI bus.

System Description

Figure 1:
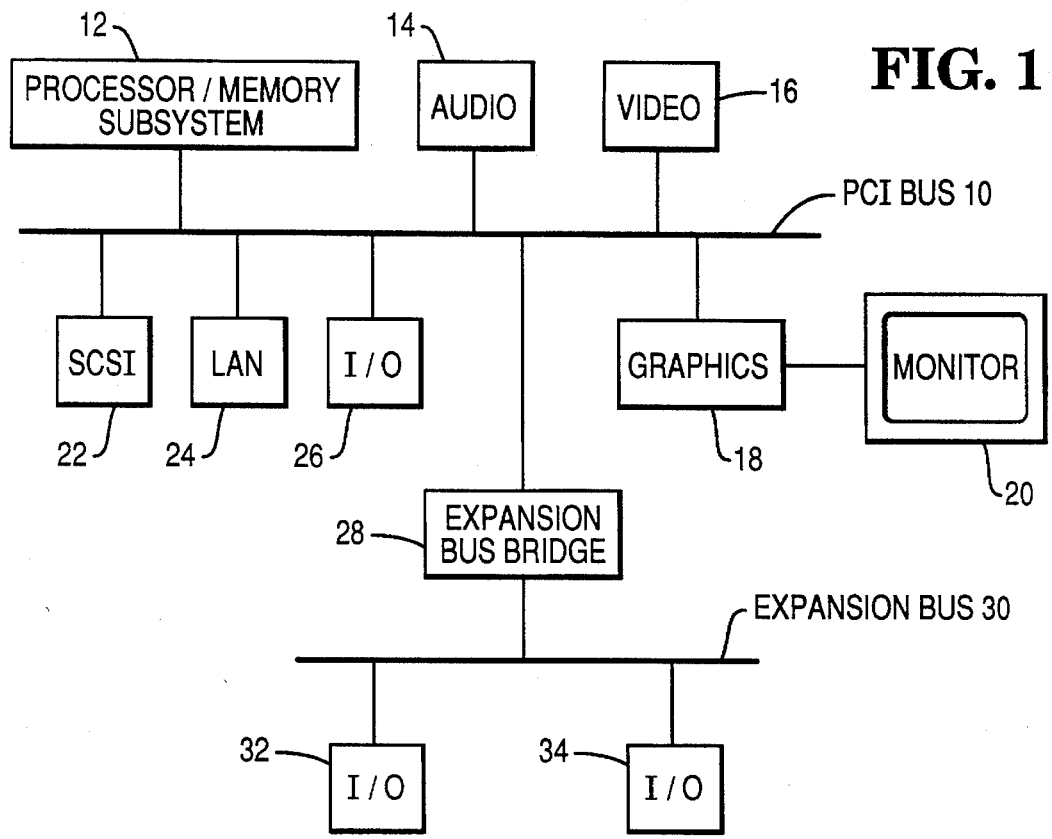
FIG. 1 is a block diagram of an example configuration of components using the PCI bus.

FIG. 1 is a block diagram of an example configuration of components using the PCI bus 10. A processor/memory subsystem 12 is coupled to the PCI bus 10, as are such peripherals as audio boards 14, video boards 16, video graphics controllers 18 for monitors 20, SCSI peripherals 22, LAN interfaces 24, and other I/O devices 26. Bridge interface logic 28 couples the PCI bus 10 to a standard expansion bus 30 and provides access therebetween for various expansion I/O boards 32, 34. Those skilled in the art will recognize that this example configuration is not intended to imply any specific architectural limits.

In the present invention, a processor/memory subsystem 12 may directly access peripheral devices mapped anywhere in the memory or I/O address spaces via a PCI bus 10. Components connected to the PCI bus 10 may be any one of three classes: master, slave, or master-slave combination. Provided these components are all compliant with the PCI specification, the PCI bus 10 becomes a VLSI interconnect, with no "glue" logic necessary. However, if it is necessary to attach components to the bus that are not compliant with the PCI specification, then specialized logic devices can be used to make the connection to the PCI bus.

Signal Definition

Figure 2:
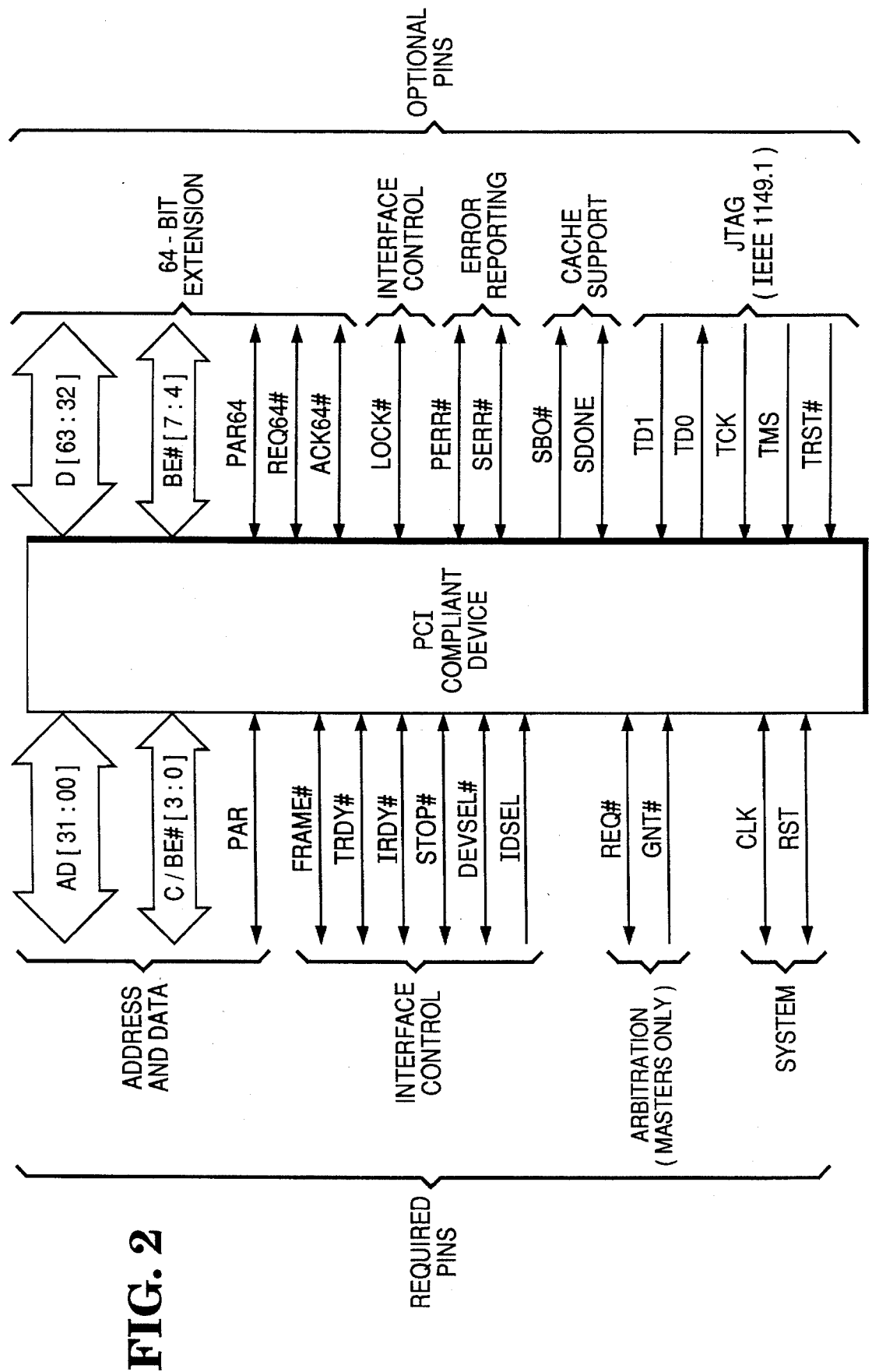
FIG. 2 illustrates the signal definitions of the PCI bus according to the present invention.

FIG. 2 illustrates the signal definitions of the PCI bus according to the present invention. The PCI bus requires a minimum of 45 pins for a slave-only device and 47 pins for a master-only or master-slave device to handle data and addressing, interface control, arbitration, and system functions. Optional error reporting requires two additional pins. The pins in FIG. 2 are shown in functional groups, with required pins on the left side, and optional pins on the right side. The direction indication on the signals in FIG. 2 assumes a combination master-slave device. A selected subset of the signals are described below in more detail. For more information on the other signals, refer to the document *Peripheral Component Interconnect (PCI), Revision 1.0 Specification*, Jun. 22, 1992, incorporated by reference herein.

Note that there are certain conventions to the signal names defined below:

1. The # symbol at the end of a signal name indicates that the active state occurs when the signal is at a low voltage; otherwise, the signal is active at a high voltage.
2. The "(in)" symbol indicates a standard input-only signal.
3. The "(out)" symbol indicates a totem pole output, i.e., a standard active driver.
4. The "(t/s)" symbol indicates a tri-state signal, i.e., a bi-directional, tri-state, input/output signal.
5. The "(s/t/s)" symbol indicates a sustained tri-state signal, i.e., an active low tri-state signal owned and driven by one device at a time. The device that drives a (s/t/s) signal low must drive it high for at least one clock before letting it float. A new device cannot start drive a (s/t/s) signal any sooner than one clock after the previous owner tri-states it. A pull-up is required to sustain the inactive state until another device drives it, and must be provided by a central resource.

System Signals

CLK (in)

The CLK (Clock) signal provides timing for all transactions on the PCI bus and is an input to every device. All other PCI bus signals are sampled on the rising edge of the CLK signal, and all other timing parameters are defined with respect to this edge. It is expected that the PCI bus may operate over a wide range of frequencies for the CLK signal.

AD[31::00] (t/s)

The AD (Address and Data) signals are multiplexed on the same pins of the PCI bus. During the first clock of a transaction, the AD signals contain a 32-bit target device address. During subsequent clocks, the AD signals contain up to 4 bytes of data.

C/BE#[3::0] (t/s)

The C/BE (Bus Command and Byte Enable) signals are multiplexed on the same pins of the PCI bus. During the address phase of a transaction, the C/BE# signals define a bus command. During the data phase of the transaction, the C/BE# signals are used as "Byte Enables" for the 32 AD signals. The Byte Enables determine which byte lanes, i.e., 8-bit groups, of the AD signals carry meaningful data. For example, the C/BE#[0] signal applies to byte 0 of the AD signals, and the C/BE#[3] signal applies to byte 3 of the AD signals.

Interface Control Signals

FRAME# (s/t/s)

The FRAME# (Cycle Frame) signal is driven by the current master device to indicate the beginning and duration of an access. The FRAME# signal is asserted to indicate a bus transaction is beginning. While the FRAME# signal is asserted, data transfers continue. When the FRAME# signal is de-asserted, the transaction is in the final data phase.

TRDY# (s/t/s)

The TRDY# (Target Ready) signal indicates the target device's ability to complete the current data phase of the transaction. The TRDY# signal is used in conjunction with the IRDY# signal described below. A data phase is completed on any clock where both the TRDY# and IRDY# signals are asserted. During a read, the TRDY# signal indicates that valid data is present on the AD signals. During a write, the TRDY# signal indicates that the target device is prepared to accept data. Wait cycles are inserted until both the IRDY# and TRDY# signals are asserted together.

IRDY# (s/t/s)

The IRDY# (Initiator Ready) signal indicates the initiating device's (master device's) ability to complete the current data phase of the transaction. The IRDY# signal is used in conjunction with the TRDY# signal. A data phase is completed on any clock that both the IRDY# and TRDY# signals are asserted. During a write, the IRDY# signal indicates that valid data is present on the AD signals. During a read, the IRDY# signal indicates that the master device is prepared to accept data. Wait cycles are inserted until both the IRDY# and TRDY# signals are asserted together.

DEVSEL# (s/t/s)

The DEVSEL (Device Select) signal, when actively driven, indicates that the driving device has decoded its address as the target device for the current transaction. As an input, the DEVSEL# signal indicates whether any device on the bus has been selected.

Arbitration (master devices only)

REQ# (out)

The REQ# (Request) signal indicates to a central bus arbiter that the device desires use of the bus. The REQ# signal is a point-to-point signal, and every master device and master-slave device has its own REQ# signal connection with the arbiter.

GNT# (in)

The GNT# (Grant) signal indicates to the device that access to the bus has been granted by the arbiter. The GNT# signal is a point-to-point signal, and every master device and master-slave device has its own GNT# signal connection with the arbiter.

Basic Transaction Control

In order to minimize access latency, the PCI specification uses an arbitration approach to bus transactions the is access-based, rather than time-slot-based. Thus, a master device must arbitrate for each access it performs on the bus.

Preferably, a central arbitration scheme is used, wherein each master device has a unique request (REQ#) and grant (GNT#) signal connected to the central arbiter device. A simple request-grant handshake between the arbiter and the master device is used to gain access to the bus.

A specific arbitration algorithm must be implemented by the arbiter, e.g., priority, rotating priority, fair, etc. An arbitration algorithm must be defined to establish a basis for a worst case latency guarantee. The arbitration occurs during a previous access so that no PCI bus cycles are consumed due to arbitration algorithm. The arbiter can implement any scheme as long as only a single GNT# is asserted on any clock.

A device requests the bus by asserting its REQ# signal. When the arbiter determines a device may use the bus, it asserts the device's GNT# signal. The arbiter may de-assert a device's GNT# signal on any clock. Therefore, a device must insure its GNT# is asserted on the clock edge it wants to start a transaction. If the GNT# signal is de-asserted, then the transaction must not proceed.

The GNT# signal normally gives a device access to the bus for a single transaction. If the device desires another access, it should continue to assert its REQ# signal. A device may de-assert its REQ# signal anytime, but the arbiter may interpret this to mean the device no longer requires use of the bus and may de-assert the device's GNT# signal.

After bus ownership has been granted to a master device, the FRAME# signal is asserted by being driven to a low voltage by the master device to indicate the beginning of the transaction. The first clock edge on which the FRAME# signal is asserted is the address phase, and the address and bus command code are transferred by the AD and C/BE# signals on that clock edge.

The bus commands are preferably encoded in the following format:

| C/BE#[3::0] | Command Type |
| --- | --- |
| 0000 | Interrupt Acknowledge |
| 0001 | Special Cycle |
| 0010 | I/O Read |
| 0011 | I/O Write |
| 0100 | Reserved |
| 0101 | Reserved |
| 0110 | Memory Read |
| 0111 | Memory Write |
| 1000 | Reserved |
| 1001 | Reserved |
| 1010 | Configuration Read |
| 1011 | Configuration Write |
| 1100 | Memory Read Multiple |
| 1101 | Dual Address Cycle |
| 1110 | Memory Read Line |
| 1111 | Memory Write and Invalidate |

The use and operation of the Special Cycle command is described below in more detail. For more information on the use and operation of other commands, refer to the document *Peripheral Component Interconnect (PCI), Revision* 1.0 *Specification*, Jun. 22, 1992, incorporated by reference herein.

The next clock edge begins the first of one or more data phases, during which data is transferred by the AD signals between the master device and the target device on each clock edge for which both the IRDY# and TRDY# signals are asserted by the master device and the target device, respectively. Wait cycles may be inserted in a data phase by either the master device or the target device with the IRDY# and TRDY# signals.

At such time as the master device intends to complete only one more data transfer (which could be immediately after the address phase), the FRAME# signal is de-asserted and the IRDY# signal is asserted indicating the master device is ready. After the target device indicates the final data transfer, by asserting the TRDY# signal, the interface returns to the idle state with both the FRAME# and IRDY# signals de-asserted.

Special Cycle Command

The Special Cycle command is a PCI bus protocol mechanism that provides a simple means for making "soft", i.e., configurable, transaction types for use on a PCI bus. The Special Cycle command contains no explicit destination address, but is broadcast to all devices on the PCI bus. During the first data phase, the AD[7::0] signals transmit an encoded Message ID. Each receiving device determines whether the message is intended for it, based on a decoding of the Message ID.

The AD[7::0] signals allow for 256 distinct Message IDs. These Message IDs are divided into 3 groups. The first group is "hard-coded" Message IDs that comprise the lower 64 values.

These "hard" Message IDs each have specific definition defined below:

| AD[7] | AD[0] | Message type |
|-------|-------|--------------|
| 0000  | 0000  | SHUTDOWN     |
| 0000  | 0001  | HALT         |
| 0000  | 0010  | reserved     |
| 0000  | 0011  | reserved     |
| ***   | ***   | ***          |
| 0011  | 1111  | reserved     |

The SHUTDOWN message type is a broadcast message indicating that the processor is entering into a shutdown mode. The HALT message type is a broadcast message indicating the processor has executed a halt instruction. As new messages are defined they will be added to the list. The second group of Message IDs comprises the middle 128 values, which are not presently defined.

The third group of Message IDs comprises the upper 64 values, which are the "soft" Message IDs that are defined under software control. These Message IDs are considered "soft" because they are device-dependent and thus beyond the PCI specification.

During the second and subsequent data phases, optional message dependent data may be encoded on the C/BE# and AD signals. This optional data is not required and can be defined by the function associated with the Message ID. While some form of destination addressing could be buried in this optional data, this is not the general intent. In most cases, explicitly addressed messages will not be handled using the Special Cycle command.

"Soft" Message ID Configuration

Figure 3:
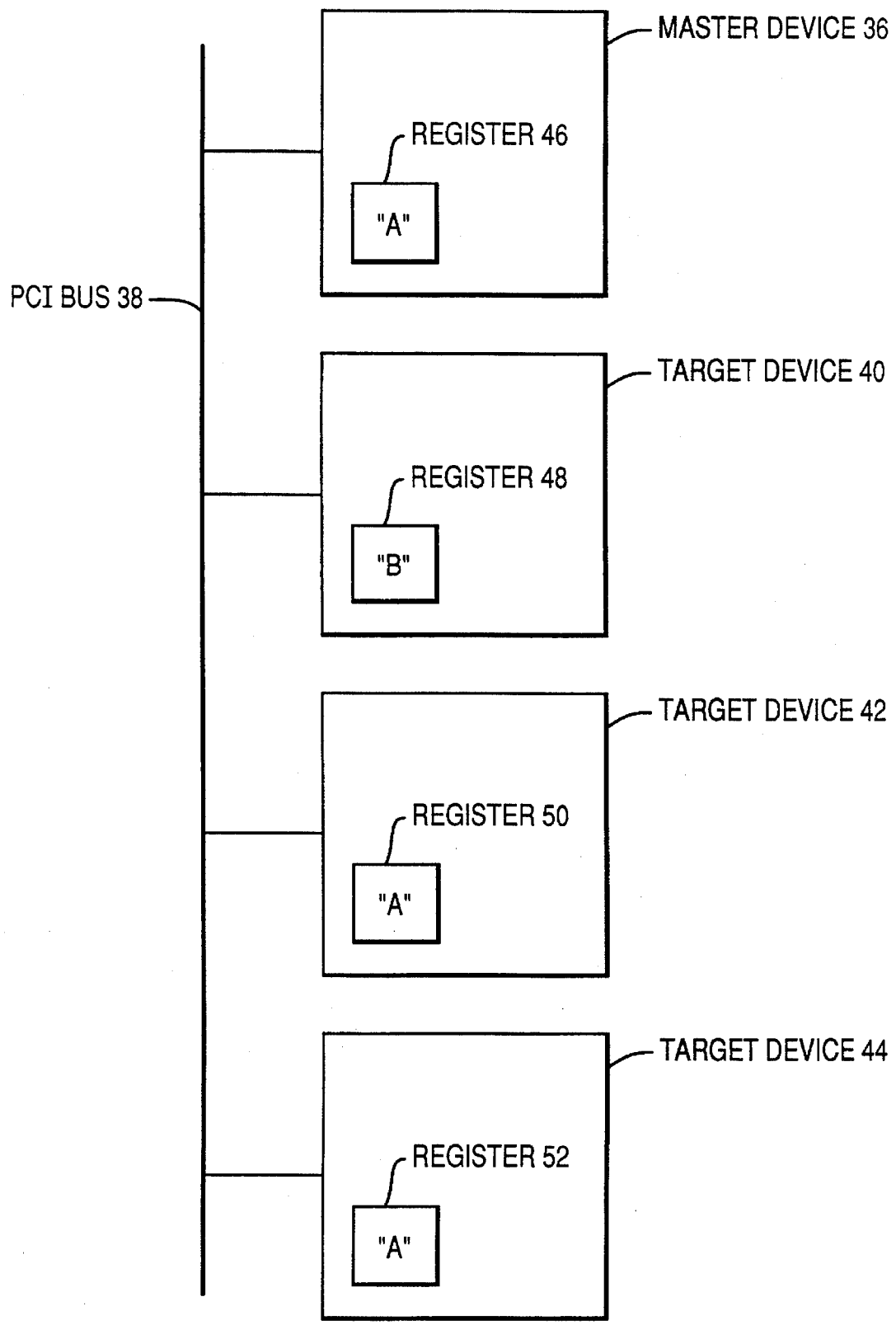
FIG. 3 is an example configuration illustrating the use of the Special Cycle command.

FIG. 3 is an example configuration illustrating the use of the Special Cycle command. A master device 36 is coupled to the PCI bus 38, as are target devices 40, 42, and 44. During system startup (or some other appropriate time) configuration software initializes a "soft" function by allocating to it a "soft" Message ID value, e.g., the value "A".

Allocated Message ID values are then loaded into Message ID registers 46, 50, and 52 of devices 36, 42, and 44, respectively, that perform the "soft" function. Note that the Message ID register 48 of device 40 does not contain the "A" value, but instead contains a "B" value.

When the master device 36 wishes to invoke the function, it broadcasts a Message ID value of "A" using a Special Cycle command. Target devices 40, 42 and 44 respond to the Special Cycle command by sampling the Message ID associated therewith and comparing it to the value stored in their respective registers 48, 50 and 52 to determine whether to process the Special Cycle command. If there is match, e.g., by target devices 50 and 52 in FIG. 3, the Special Cycle command is processed and the associated function is performed. If there is no match, e.g., by target device 48 in FIG. 3, the Special Cycle command is not processed and the associated function is not performed.

These "soft" Message IDs provide a flexible way to implement device-specific signalling functions as new applications are implemented. In contrast to "hard" Message IDs, these "soft" Message IDs can be defined dynamically, without the need for any industry group to manage their allocation. Further, such dynamic definition eliminates concern over running out of Message ID values.

Special Cycle Transaction

Figure 4:
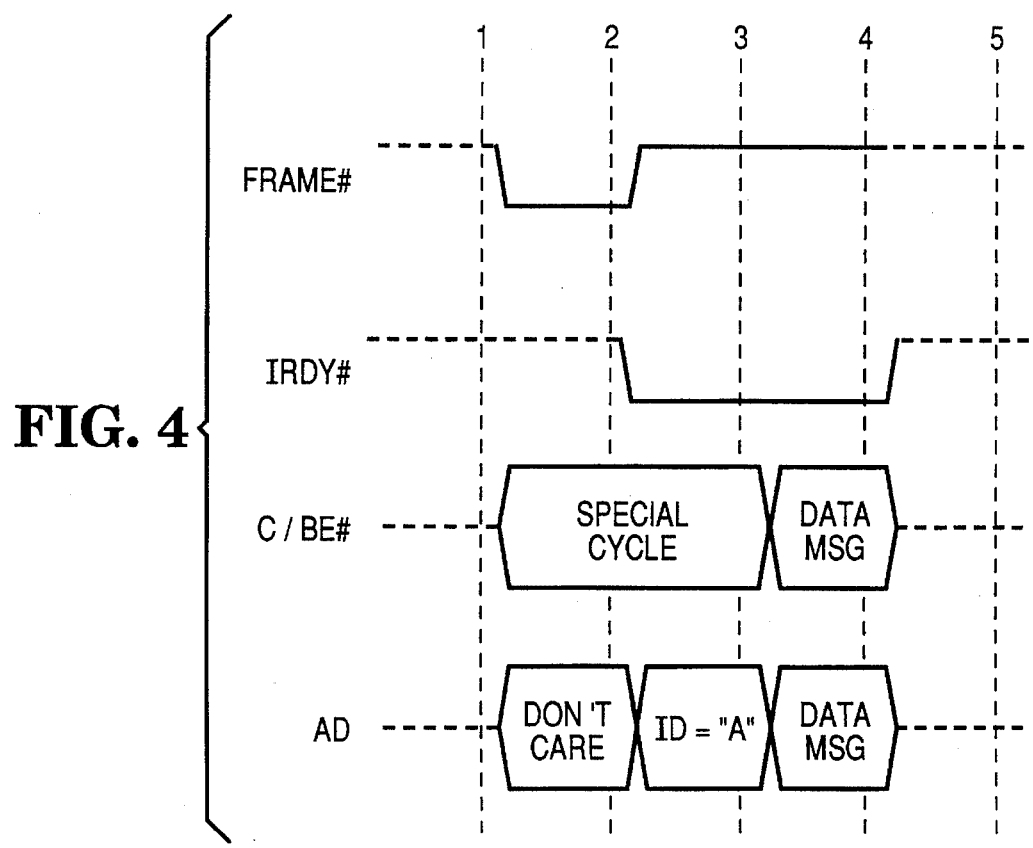
FIG. 4 is a timing chart illustrating a Special Cycle transaction on the PCI bus.

FIG. 4 is a timing chart illustrating a Special Cycle transaction on the PCI bus. A Special Cycle command is initiated by a master device once the master device has been granted access to the PCI bus. The initiation of the Special Cycle command is unilateral in that there is no target device handshaking of any kind. In other words, the Special Cycle command is a broadcast command from the master device.

A Special Cycle command is like any other bus command in that there is an address phase and one or more data phases. The address phase starts like all other transactions with the assertion of the FRAME# signal by the master device in clock period 1. Thereafter, the target devices wait for the assertion of the IRDY# signal by the master device in clock period 2 to know when the C/BE# and AD signals are valid.

During the address phase, the C/BE#[3::0] signals contain the value "0001" identifying the Special Cycle command, and the AD signals are driven to a stable level, i.e., containing "don't care" values, to ensure that the bus does not float.

During the first data phase, the C/BE#[3::0] signals still contain the value "0001" identifying the Special Cycle command, and the AD[7::0] signals contain the Message ID associated with the "soft" function. The remaining AD signals are driven to a stable level to ensure that the bus does not float.

Interested devices determine whether the message is intended for them, based on a decoding of the Message ID. However, no device will ever assert their DEVSEL# signal in response to a Special Cycle command. This means that there is no handshaking during these transactions and thus no delivery guarantees.

During the second and subsequent data phases, message dependent optional data may be encoded on the C/BE# and AD signals. The optional data is not required and can be defined by the function associated with the Message ID.

During the transaction, the master device issuing a Special Cycle command can also insert wait states using the IRDY# signal, although the target device cannot insert wait states using the TRDY# signal.

The transaction terminates like all other transactions when both the FRAME# and IRDY# signals are de-asserted by the master device in clock period 4.

Broadcast Timestamps

The Special Cycle command can be used to control deterministic "isochronous" (period-based) activities. Emerging multimedia applications, such as real-time audio and video processing, typically require such an isochronous computing capability. For example, live video may require that a frame buffer be updated 30 times per second at precise 1/30th of a second intervals. Such activity may be timed by a free-running clock with 1/30th of a second period. Every clock period initiates a flurry of activity to accomplish the frame update. Once the update activity is completed, the hardware and software agents responsible for the update become idle until the next clock period.

In a complex environment, there may be multiple isochronous activity streams occurring simultaneously, each potentially timed by its own clock. In such scenarios, devices participating in a particular activity stream may coordinate low-level real time activity between themselves, unattended by the host processor.

If the host processor tried to manage this activity directly, it could be so overwhelmed by timer interrupt processing that performance could be seriously degraded and/or data lost due to loss of synchronicity, i.e., clock period "N+1" occurs before all the events required to be processed in clock period "N" are fully processed.

Figure 5:
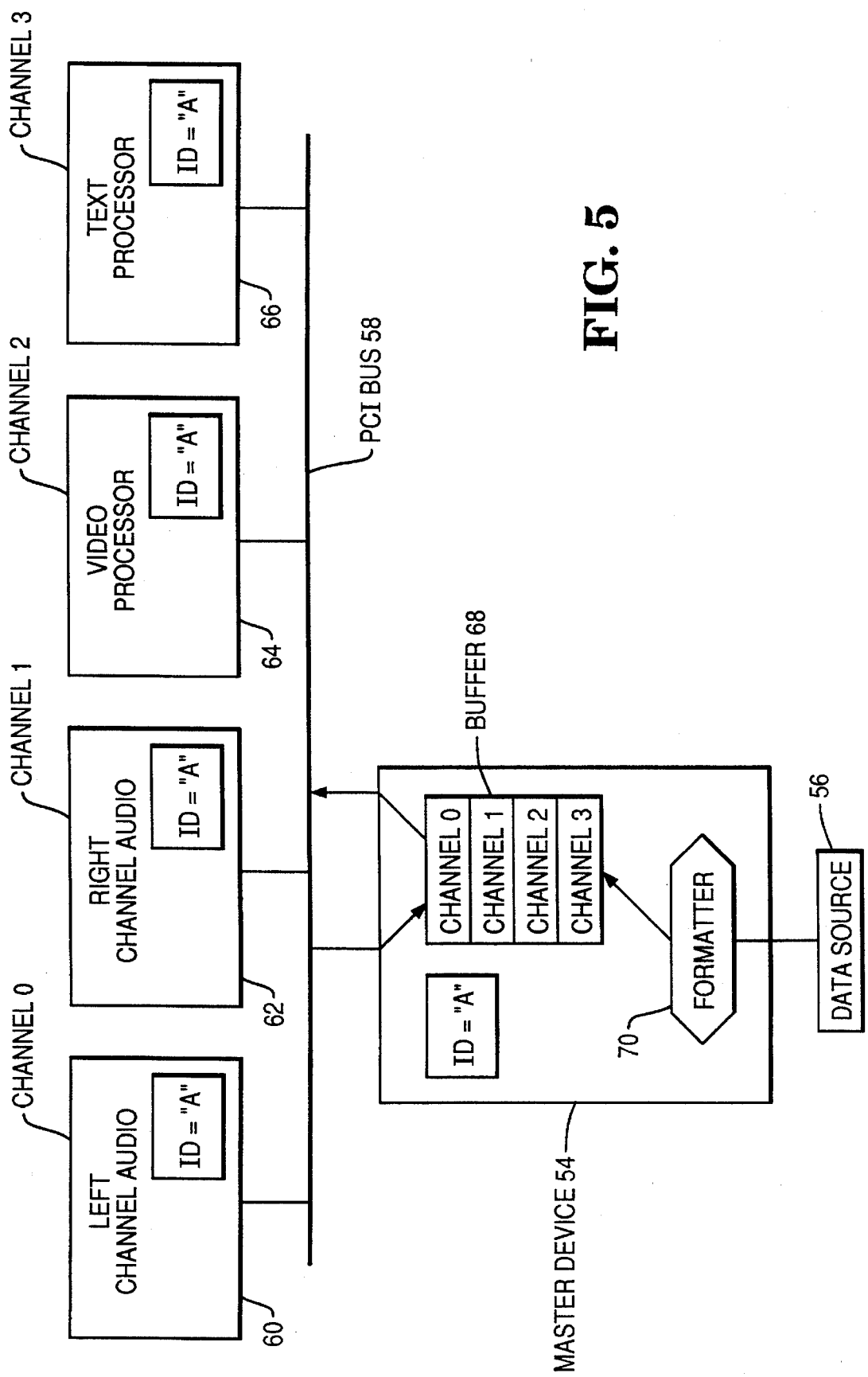
FIG. 5 is an example configuration illustrating the use of the Special Cycle command to control deterministic isochronous activities.

FIG. 5 is an example configuration illustrating the use of the Special Cycle command to control deterministic isochronous activities. A master device 54 receives both audio and video data from a data source 56. The master device 54 is coupled to the PCI bus 58, as are target devices comprising a left channel audio processor 60, right channel audio processor 62, video processor and 64, and text processor 66. Each of the devices 54, 60, 62, 64 and 66 have configurable Message ID registers containing a Message ID value of "A".

The master device 54 uses Special Cycle commands with "Soft" Message IDs to broadcast one or more periodic "timestamps" to participating target devices 60, 62, 64 and 66 across the PCI bus 58. Assume, for example, that the target devices 60, 62, 64, and 66 require an isochronous activity stream with a period of 1/30th of a second. At startup (or some other appropriate time), a "Soft" Message ID value of "A" is assigned to perform the timer function, and this Message ID value is loaded into the appropriate registers in the devices 54, 60, 62, 64, and 66, respectively, that will participate in the timed function. Once initialized, the master device 54 is responsible for timing generation and arbitrates for the bus every 1/30th of a second. When bus access is granted, the master device 54 issues a Special Cycle command with the "Soft" Message ID value of "A". Target devices 60, 62, 64, and 66 sample the "Soft" Message ID value and compare it to the Message ID value stored in their registers. When a match is made, target devices 60, 62, 64, and 66 recognize this event as the trigger to initiate the timed function. Thus, multiple period-based activity streams timed by unrelated clocks can be readily accommodated by this technique, simply by assigning a unique "Soft" Message ID to each activity stream.

Figure 6:
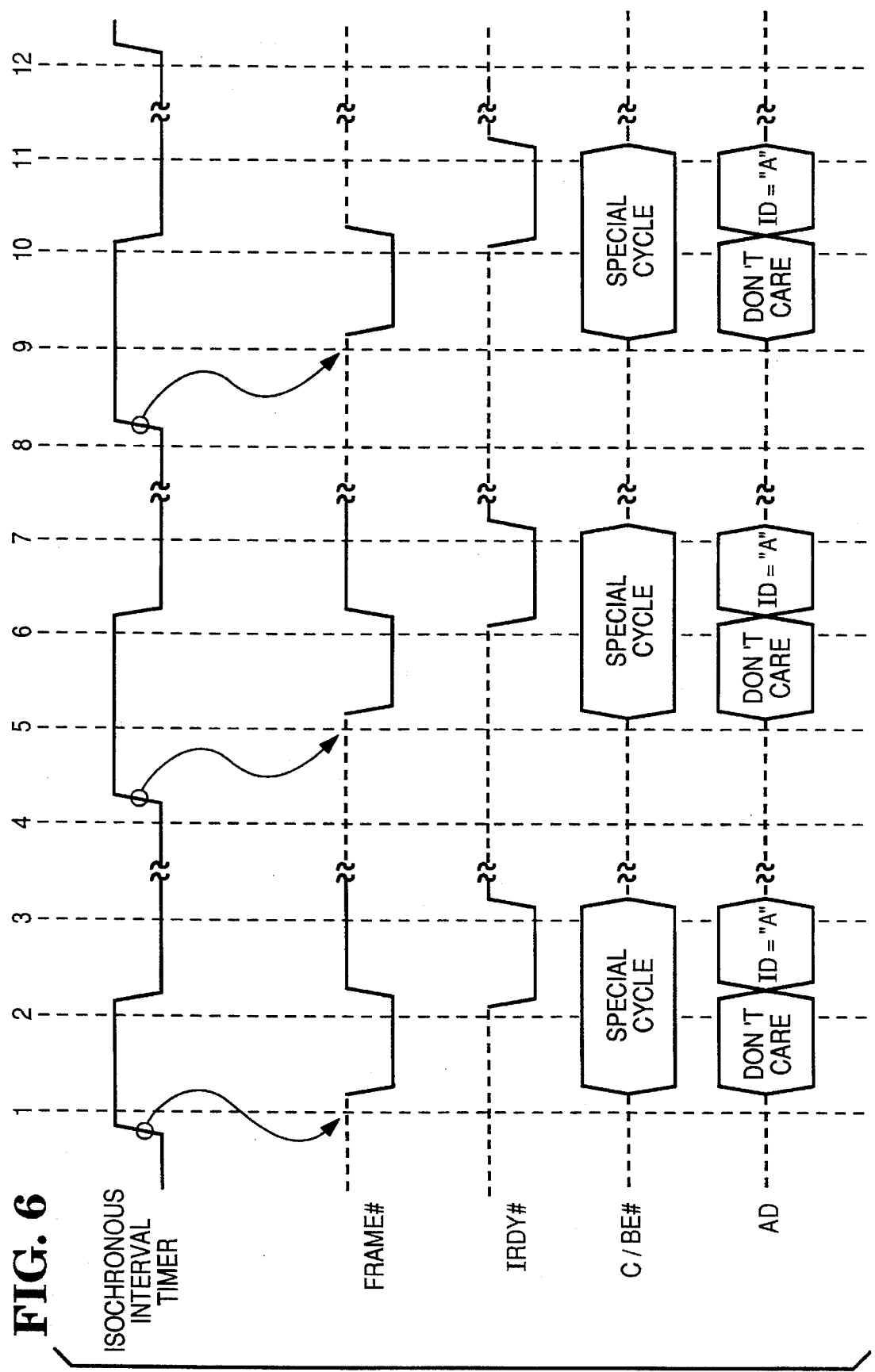
FIG. 6 is a timing chart illustrating a Special Cycle transaction that controls deterministic isochronous activities.

FIG. 6 is a timing chart illustrating a Special Cycle transaction that controls deterministic isochronous activities. In this example, an isochronous interval timer is triggered every 4 clock edges, i.e., clock edges 1, 5, and 9. However, the "//" characters between clock edges 3 and 4, 7 and 8, and 11 and 12, are meant to indicate that the timer interval may encompass any number of clock periods. When the timer triggers, a Special Cycle command is initiated by a master device, once the master device has been granted access to the PCI bus.

The address phases, at clock edges 2, 6, and 10, start with the assertion of the FRAME# signal by the master device. During the address phase, the C/BE#[3::0] signals contain the value "0001" identifying the Special Cycle command, and the AD signals are driven to a stable level, i.e., "don't care" values, to ensure the bus does not float.

During the first data phases, at clock edges 3, 7, and 11, the C/BE#[3::0] signals still contain the value "0001" identifying the Special Cycle command, and the AD[7::0] signals contain the Message ID value of "A". The remaining AD signals are driven to a stable level, i.e., "don't care" values, to ensure the bus does not float. Interested devices determine whether the message is intended for them, based on a decoding of the Message ID.

During optional second and subsequent data phases (not shown), optional message dependent data may be encoded on the C/BE# and AD signals. The optional data is not required and can be defined by the function associated with the Message ID.

The transaction terminates like all other transactions when both the FRAME# and IRDY# signals are de-asserted by the master device. Thereafter, the next trigger of the timer starts the Special Cycle transaction again.

Some or all of the timer functions may be embedded in a central bus arbiter device, so that the arbiter can issue the required Special Cycle commands with the "Soft" Message IDs. The advantage of this technique is that the arbiter is the highest priority master device on the PCI bus. For example, in response to one or more internal timer requests, the arbiter can de-assert an outstanding GNT# signal to take bus ownership away from the current master device, and then issue all the required Special Cycle commands before surrendering control again. This technique provides optimal timing precision, i.e., the worst case latency from internal timer request to timestamp broadcast is approximately the worst case latency for a master device to release bus control after its GNT# signal is de-asserted. The actual broadcasts of Special Cycle commands consume little bandwidth of the PCI bus because they are broadcast via efficient, master device terminated Special Cycle commands. Thus, issuing three or four back-to-back Special Cycle commands triggered by timing functions would likely have minimal impact on the average latency seen by other devices attached to the PCI bus.

Isochronous Multi-Channel Data Streams

Figure 7:
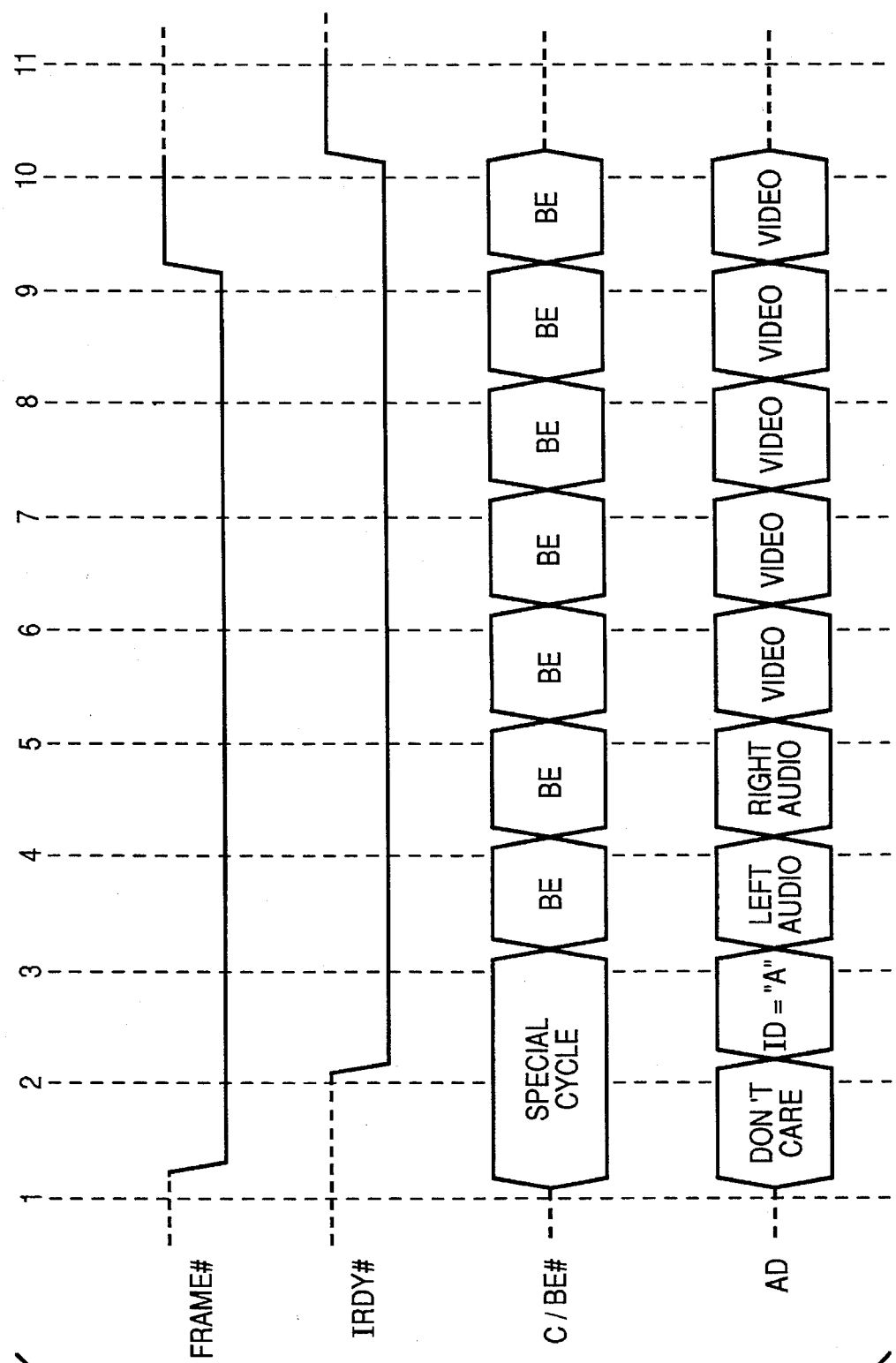
FIG. 7 is a timing chart illustrating the application of the Special Cycle commands to "multi-channel" activity streams.

FIG. 7 is a timing chart illustrating the application of the Special Cycle commands to "multi-channel" activity streams. In these multi-channel activity streams, the master device issues a Special Cycle command containing combination data, wherein the combination data comprises a plurality of different portions directed specifically to a plurality of different target devices. For example, assume that the Special Cycle command contains combination data, wherein a first portion is intended for the left channel audio processor, a second portion is intended for the right channel video processor, and the third through ninth portions are intended for the video processor. Thus, three target devices in FIG. 5, left channel audio processor 60, right channel audio processor 62 and video processor 64, participate in the activity stream by responding to the Special Cycle command, wherein each of the target devices 60, 62, and 64 captures the portion of the combination data for which it is responsible.

Figure 8:
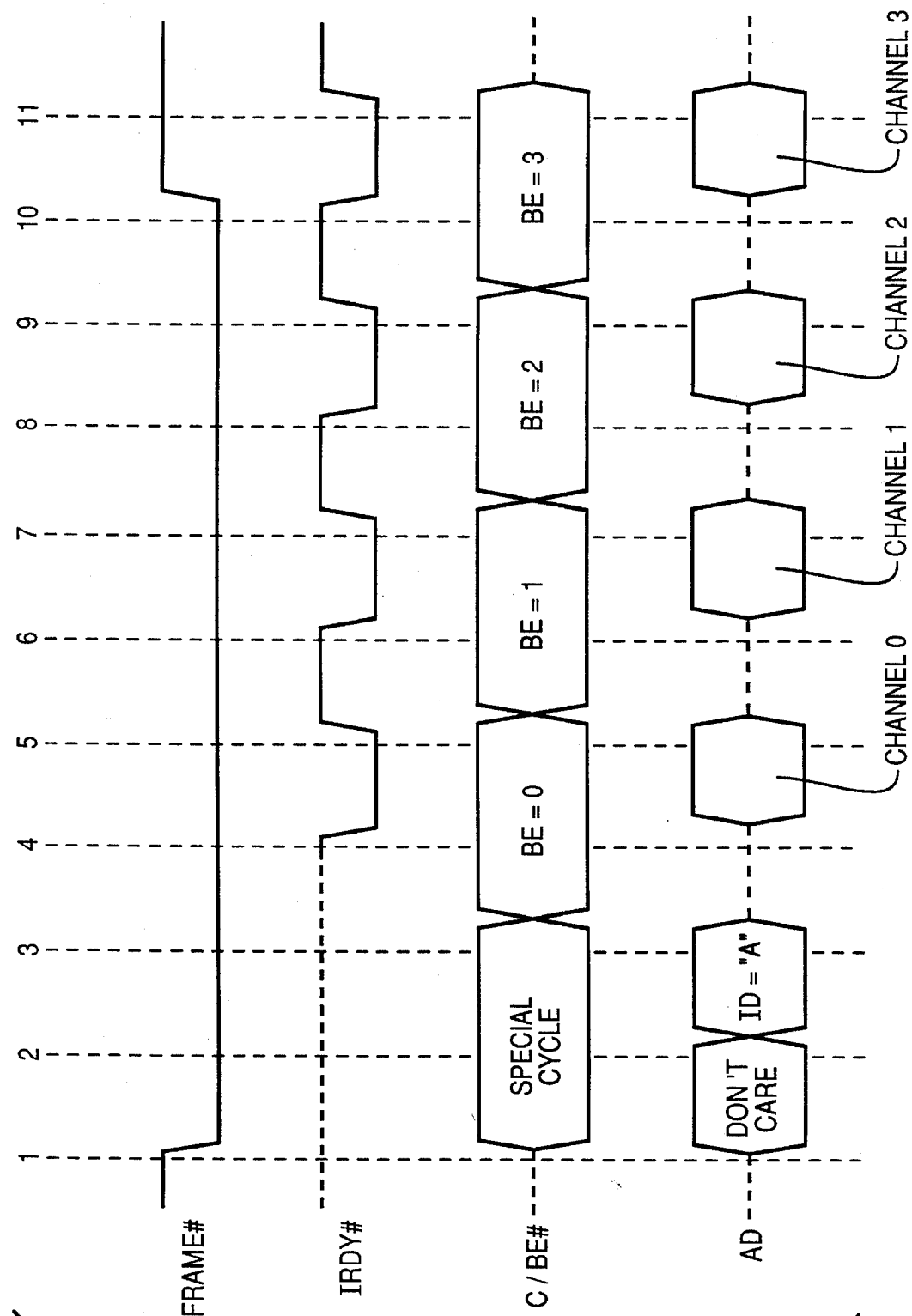
FIG. 8 is a timing chart illustrating the use of the Special Cycle command to control "multiplexed" activity streams.

FIG. 8 is a timing chart illustrating the use of the Special Cycle command to control "multiplexed" activity streams, for example, a four-channel, time-division-multiplexed (TDM) activity stream. A Special Cycle command is initiated by a master device, once the master device has been granted access to the PCI bus. The address phase starts with the assertion of the FRAME# signal by the master device in clock period 1.

During the address phase, the C/BE#[3::0] signals contain the value "0001" identifying the Special Cycle command, and the AD signals are driven to a stable level, i.e., "don't care" values, to ensure the bus does not float.

During the first data phase, the C/BE#[3::0] signals still contain the value "0001" identifying the Special Cycle command, and the AD[7::0] signals contain the Message ID value of "A". The remaining AD signals are driven to a stable level to ensure the bus does not float. Interested target devices determine whether the message is intended for them, based on a decoding of the Message ID.

In this example, channel selection is encoded on the C/BE# signals during the second and subsequent data phases. As indicated in FIG. 5, the left channel audio processor 60 receives data from the master device 54 on channel 0, the right channel audio processor 62 receives data from the master device 54 on channel 1, the video processor 64 receives data from the master device 54 on channel 2, and the text processor 66 receives data from the master device 54 on channel 3.

When a target device 60, 62, 64, or 66 recognizes its channel selection, e.g., at clock edges 5, 7, 9, and 11, respectively, it samples its channel data from the AD signals. The master device 54 uses the IRDY# signal to force wait cycles while the channel selection is changed on the C/BE# signals.

The transaction terminates like all other transactions when both the FRAME# and IRDY# signals are de-asserted by the master device 54 in clock period 11.

Those skilled in the art will recognize that from these examples that there are numerous other potential applications of the present invention. For example, this multiplexed activity stream can also be used to coordinate direct device-to-device data transfers (somewhat similar to fly-by DMA data transfers).

Conclusion

In summary, a Peripheral Component Interconnect (PCI) bus has been described for component level interconnection of processors, peripherals and memories. The PCI bus includes a protocol mechanism for defining "soft", i.e., configurable, transaction types for use between devices communicating on the PCI bus. Using the Special Cycle command, two or more devices attached to the bus can establish a device-specific logical signalling channel that expands upon, but does not violate, the PCI specification. This device-specific signalling channel provides logical sideband signaling between PCI bus devices, when such signaling does not require the precise timing or synchronization of physical signals. This allows the systems designer to define necessary sideband signalling without requiring any additional pins on the PCI bus.

The foregoing description of the preferred embodiment of the present invention has been presented only for the purposes of illustration and description. The foregoing description is not intended to be exhaustive or to limit the invention to the precise form disclosed. Many modifications and variations are possible in light of the teaching herein. For example, the following paragraphs describe some alternatives in accomplishing the same invention.

Those skilled in the art will recognize that the present invention is applicable to systems with different configurations of devices and components. The example configurations of devices and components cited in the present specification are for illustrative purposes only and are not intended to be exhaustive or to limit the invention to the precise form disclosed.

Those skilled in the art will recognize that the present invention is applicable to buses with different pin counts and different signal definitions. The pin counts and signal definitions cited in the present specification are for illustrative purposes only and are not intended to be exhaustive or to limit the invention to the precise form disclosed.

Those skilled in the art will recognize that the present invention is applicable to buses with different electrical characteristics. The electrical characteristics cited in the present specification are for illustrative purposes only and are not intended to be exhaustive or to limit the invention to the precise form disclosed.

Those skilled in the art will recognize that the present invention is applicable to buses with different transaction types, including transactions with different functional sequences. The transactions cited in the present specification are for illustrative purposes only and are not intended to be exhaustive or to limit the invention to the precise form disclosed.

It is intended that the scope of the invention be limited not by this detailed description, but rather by the claims appended hereto.

What is claimed is:

1. An interconnection apparatus for connecting processors, peripherals and memories, comprising:

(a) a plurality of electronic devices;

(b) a bus comprising a plurality of electrically conductive signal connections coupled between the electronic devices for communicating electrical signals therebetween;

(c) protocol means for communicating a configurable transaction between devices on the bus, wherein two or more devices attached to the bus establish a device-specific logical sideband signalling channel for communication therebetween using the configurable transaction, wherein the configurable transaction comprises a special command and a message value, the special command identifies the configurable transaction, and the message value identifies a function; and (d) configuration means for initializing the configurable transaction by assigning the message value to the function, for communicating a correlation between the assigned message value and the function to all devices performing the function during an initialization phase, and for invoking the function by broadcasting the configurable transaction comprising the special command and the assigned message value to the devices after the initialization phase.

2. The apparatus as set forth in claim 1 above, wherein the devices each further comprises means for recognizing the special command, for sampling the message value associated therewith, for comparing the message value to a stored value, and for performing the function when the message value matches the stored value.

3. The apparatus as set forth in claim 2 above, wherein the devices determine whether to respond to the configurable transaction based on a decoding of the message value.

4. The apparatus as set forth in claim 1 above, wherein the configurable transaction contains no explicit destination address.

5. The apparatus as set forth in claim 1 above, further comprising means for generating a configurable transaction identifying a specific function on a timed basis to control isochronous activities.

6. The apparatus as set forth in claim 1 above, further comprising a central arbiter device for arbitrating access to the bus by the devices, wherein the central arbiter device further comprises means for generating a configurable transaction identifying a specific function on a timed basis to control isochronous activities.

7. The apparatus as set forth in claim 1 above, wherein the configurable transaction further comprises a data portion, wherein the data portion comprises a device selector and device-specific data portion directed to the device identified by the device selector, and the data portion comprises a plurality of different subportions, each of which are directed specifically to one of a plurality of different devices.

8. A method of communicating among a plurality of electronic devices coupled to a bus, comprising the steps of:
  (a) initializing a function by assigning a message value to the function, communicating a correlation between the assigned message value and the function to all devices that perform the function during an initialization phase, and storing the message value in the devices that perform the function; and
  (b) invoking the function by broadcasting the message value to the devices via the bus, wherein the devices compare the broadcast message value to the stored value and perform the function when the broadcast message value matches the stored value.

9. The method as set forth in claim 8 above, wherein the broadcasting step further comprises the step of broadcasting the message value at timed intervals to control isochronous activities.

10. The method as set forth in claim 8 above, further comprising broadcasting a data portion with the message value, wherein the data portion comprises a plurality of different subportions directed specifically to a plurality of different devices.

11. The method as set forth in claim 10 above, wherein the data portion comprises a device selector and device-specific data portion directed to the device identified by the device selector.

12. The method as set forth in claim 8 above, further comprising broadcasting a data portion with the message value, wherein the data portion comprises a plurality of different subportions directed specifically to a plurality of different functions within a device.

13. An interconnection apparatus for connecting processors, peripherals and memories, comprising:
  (a) a plurality of electronic devices;
  (b) a bus comprising a plurality of electrically conductive signal connections coupled between the electronic devices for communicating electrical signals therebetween; and
  (c) protocol means for communicating a configurable transaction between devices via the bus, wherein the configurable transaction comprises a special command identifying the configurable transaction and a message value identifying a function to be performed on a timed basis to control isochronous activities, the protocol means further comprising means for initializing the function by assigning the message value to the function, for communicating a correlation between the assigned message value and the function to all devices performing the function during an initialization phase, and for invoking the function by broadcasting the assigned message value to the devices after the initialization phase.

14. The apparatus as set forth in claim 13 above, wherein the devices each further comprises means for recognizing the special command, for sampling the message value associated therewith, for comparing the message value to a stored value, and for performing the function when the message value matches the stored value.

15. The apparatus as set forth in claim 13 above, further comprising a central arbiter device for arbitrating access to the bus by the devices, wherein the central arbiter device further comprises means for generating a configurable transaction identifying a specific function on a timed basis to control isochronous activities.

16. The apparatus as set forth in claim 13 above, wherein the configurable transaction further comprises a data portion, wherein the data portion comprises a plurality of different subportions directed specifically to a plurality of different devices.

17. The apparatus as set forth in claim 16 above, wherein the data portion comprises a device selector and device-specific data portion directed to the device identified by the device selector.

18. The apparatus as set forth in claim 13 above, wherein the configurable transaction further comprises a data portion, wherein the data portion comprises a plurality of different subportions directed specifically to a plurality of different functions within a device.

* * * * *